United States Patent
Kuo et al.

(10) Patent No.: US 11,163,694 B2
(45) Date of Patent: Nov. 2, 2021

(54) MEMORY CONTROL METHOD, MEMORY STORAGE DEVICE AND MEMORY CONTROL CIRCUIT UNIT

(71) Applicant: PHISON ELECTRONICS CORP., Miaoli (TW)

(72) Inventors: Che-Yueh Kuo, New Taipei (TW); Ding-Yuan Chen, Taoyuan (TW)

(73) Assignee: PHISON ELECTRONICS CORP., Miaoli (TW)

( * ) Notice: Subject to any disclaimer, the term of this patent is extended or adjusted under 35 U.S.C. 154(b) by 78 days.

(21) Appl. No.: 16/414,768

(22) Filed: May 16, 2019

(65) Prior Publication Data

US 2020/0301851 A1 Sep. 24, 2020

(30) Foreign Application Priority Data

Mar. 22, 2019 (TW) ................................ 108109908

(51) Int. Cl.
*G06F 12/02* (2006.01)
*G06F 12/10* (2016.01)
*G06F 12/1036* (2016.01)
*G06F 12/12* (2016.01)

(52) U.S. Cl.
CPC ...... *G06F 12/1036* (2013.01); *G06F 12/0246* (2013.01); *G06F 12/12* (2013.01)

(58) Field of Classification Search
CPC .. G06F 12/1036; G06F 12/0246; G06F 12/12; G06F 2212/7201; G06F 12/02
USPC .................................................. 711/206, 103
See application file for complete search history.

(56) References Cited

U.S. PATENT DOCUMENTS

| | | | |
|---|---|---|---|
| 9,280,460 B2* | 3/2016 | Liang | G06F 3/0659 |
| 2008/0235467 A1* | 9/2008 | Tagawa | G06F 12/08 |
| | | | 711/154 |
| 2014/0013030 A1* | 1/2014 | Yeh | G06F 12/0246 |
| | | | 711/103 |
| 2015/0324284 A1* | 11/2015 | Kim | G06F 12/0246 |
| | | | 711/103 |
| 2017/0075600 A1* | 3/2017 | Jung | G06F 3/0685 |
| 2018/0246668 A1* | 8/2018 | Sakashita | G06F 3/061 |
| 2019/0034329 A1* | 1/2019 | Yeh | G06F 3/0619 |

(Continued)

OTHER PUBLICATIONS

Y. Ryu, "A Flash Translation Layer for nand Flash-Based Multimedia Storage Devices," in IEEE Transactions on Multimedia, vol. 13, No. 3, pp. 563-572, Jun. 2011.*

(Continued)

*Primary Examiner* — Pierre Miche Bataille
(74) *Attorney, Agent, or Firm* — JCIPRNET

(57) ABSTRACT

A memory control method for a rewritable non-volatile memory module is provided according to an exemplary embodiment of the disclosure. The method includes: maintaining first management information for identifying a first management unit in the rewritable non-volatile memory module; collecting first valid data from the first management unit according to the first management information without reading first mapping information from the rewritable non-volatile memory module in a data merge operation, and the first mapping information includes logical-to-physical mapping information related to the first valid data; and storing the collected first valid data into a recycling unit.

21 Claims, 13 Drawing Sheets

(56) References Cited

U.S. PATENT DOCUMENTS

2019/0146909 A1* 5/2019 Chu ..................... G06F 3/061
 711/103
2019/0266079 A1* 8/2019 R .......................... G06F 3/064

OTHER PUBLICATIONS

Yi-Lin Tsai, Jen-Wei Hsieh and Tei-Wei Kuo, "Configurable NAND flash translation layer," IEEE International Conference on Sensor Networks, Ubiquitous, and Trustworthy Computing (SUTC'06), Taichung, Taiwan, 2006.*

Y. Woo, S. Lee and S. L. Min, "FMMU: A Hardware-Accelerated Flash Map Management Unit for Scalable Performance of Flash-Based SSDs," 2018 55th ACM/ESDA/IEEE Design Automation Conference (DAC), 2018, pp. 1-6.*

Y. Lee, D. Jung, J. Kim and S. Maeng, "Memory management scheme for cost-effective disk-on-modules in consumer electronics devices," in IEEE Transactions on Consumer Electronics, vol. 54, No. 4, pp. 1776-1783, Nov. 2008.*

\* cited by examiner

| Management unit | 81(1) | 81(2) | ... | 81(n) |
|---|---|---|---|---|
| Identification information | 1 | 0 | ... | 1 |

| Physical unit | PU(1) | PU(2) | PU(3) | PU(4) | PU(5) | PU(6) | PU(7) | PU(8) |
|---|---|---|---|---|---|---|---|---|
| Identification information | 1 | 0 | 0 | 1 | 1 | 0 | 0 | 1 |

| PTE index | PTE(1) | PTE(2) | ... | PTE(20) | ... | PTE(30) | ... | PTE(40) | ... | PTE(50) | ... |
|---|---|---|---|---|---|---|---|---|---|---|---|
| Identification information | 1 | 1 | ... | 1 | ... | 1 | ... | 1 | ... | 1 | ... |

1301

MEMORY CONTROL METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 108109908, filed on Mar. 22, 2019. The entirety of the above-mentioned patent application is hereby incorporated by reference herein and made a part of this specification.

BACKGROUND

Technical Field

The disclosure relates to a memory control technique, and more particularly, to a memory control method, a memory storage device and a memory control circuit unit.

Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., flash memory) ideal to be built in the portable multi-media devices as cited above.

When the memory storage device leaves the factory, a part of management units in the memory storage device are configured as a plurality of spare management units so the spare management units can be used to store new data. After a period of use, the number of the spare management units in the memory storage device will gradually decrease. The memory storage device can execute a data merge procedure (a.k.a. a garbage collection procedure) to copy valid data from a plurality of source units to a recycling units (a.k.a. a target unit) and then erase the management units belonging to the source units in order to release new spare management units. However, in the data merge procedure, the more dispersed the logical units mapped to the management units selected as the source units are, the more tables that record management information (e.g., mapping information) of these logical units should be accessed. Therefore, the time for executing the data merge procedure may be extended and/or an execution efficiency of the data merge procedure may be reduced.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

The disclosure provides a memory control method, a memory storage device and a memory control circuit unit, which are capable of solving the problems described above and/or improving a system performance of the memory storage device.

An exemplary embodiment of the disclosure provides a memory control method for a rewritable non-volatile memory module. The rewritable non-volatile memory module includes a plurality of management units. The memory control method includes: maintaining first management information for identifying a first management unit among the management units in the rewritable non-volatile memory module; collecting first valid data from the first management unit according to the first management information without reading first mapping information from the rewritable non-volatile memory module in a data merge operation, wherein the first mapping information includes logical-to-physical mapping information related to the first valid data; and storing the collected first valid data into a recycling unit.

An exemplary embodiment of the disclosure further provides a memory storage device, which includes a connection interface unit, a rewritable non-volatile memory module and a memory control circuit unit. The connection interface unit is configured to couple to a host system. The rewritable non-volatile memory module includes a plurality of management units. The memory control circuit unit is coupled to the connection interface unit and the rewritable non-volatile memory module. The memory control circuit unit is configured to maintain first management information in the rewritable non-volatile memory module. The first management information is used for identifying a first management unit among the plurality of management units. The memory control circuit unit is further configured to collect first valid data from the first management unit according to the first management information without reading first mapping information from the rewritable non-volatile memory module in a data merge operation. The first mapping information includes logical-to-physical mapping information related to the first valid data. The memory control circuit unit is further configured to send a write command sequence which instructs a storing of the collected first valid data into a recycling unit.

An exemplary embodiment of the disclosure further provides a memory control circuit unit, which is configured to control a rewritable non-volatile memory module. The rewritable non-volatile memory module includes a plurality of management units. The memory control circuit unit includes a host interface, a memory interface and a memory management circuit. The host interface is configured to couple to a host system. The memory interface is configured to couple to the rewritable non-volatile memory module. The memory management circuit is coupled to the host interface and the memory interface. The memory management circuit is configured to maintain first management information in the rewritable non-volatile memory module. The first management information is used for identifying a first management unit among the plurality of management units. The memory management circuit is further configured to collect first valid data from the first management unit according to the first management information without reading first mapping information from the rewritable non-volatile memory module in a data merge operation. The first mapping information includes logical-to-physical mapping information related to the first valid data. The memory management circuit is further configured to send a write command sequence which instructs a storing of the collected first valid data into a recycling unit.

Based on the above, the first management information for identifying the first management unit among the plurality of management units may be maintained in the rewritable non-volatile memory module. In the data merge operation, the first valid data may be collected from the first management unit according to the first management information and stored into the recycling unit without reading the first mapping information from the rewritable non-volatile memory module. The first mapping information includes logical-to-physical mapping information related to the first valid data. As a result, the time for executing the data merge procedure may be effectively shorten and/or the execution efficiency of the data merge procedure may be improved to thereby improve the system performance of the memory storage device.

To make the above features and advantages of the disclosure more comprehensible, several embodiments accompanied with drawings are described in detail as follows.

It should be understood, however, that this Summary may not contain all of the aspects and embodiments of the present disclosure, is not meant to be limiting or restrictive in any manner, and that the disclosure as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 12 is a schematic diagram illustrating second management information according to an exemplary embodiment of the disclosure.

FIG. 13 is a schematic diagram illustrating third management information according to an exemplary embodiment of the disclosure.

DESCRIPTION OF THE EMBODIMENTS

Figure 1:
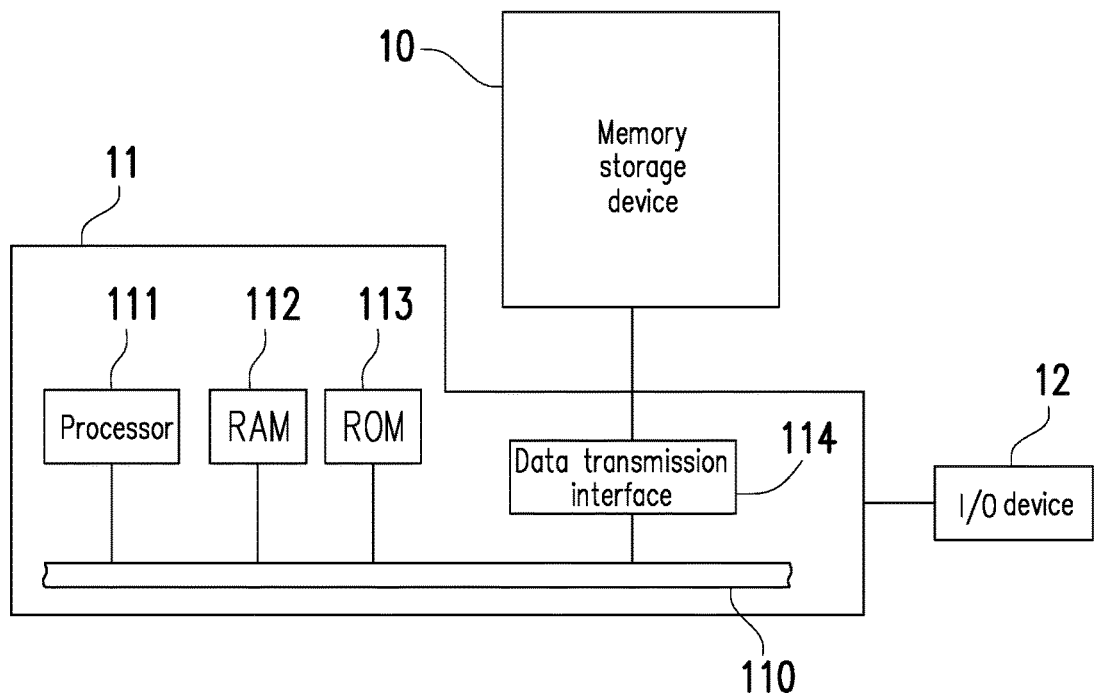
FIG. 1 is a schematic diagram illustrating a host system, a memory storage device and an I/O (input/output) device according to an exemplary embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage device (a.k.a. a memory storage system) includes a rewritable non-volatile memory module and a controller (a.k.a. a control circuit). The memory storage device usually operates together with a host system so the host system can write data into the memory storage device or read data from the memory storage device.

Figure 2:
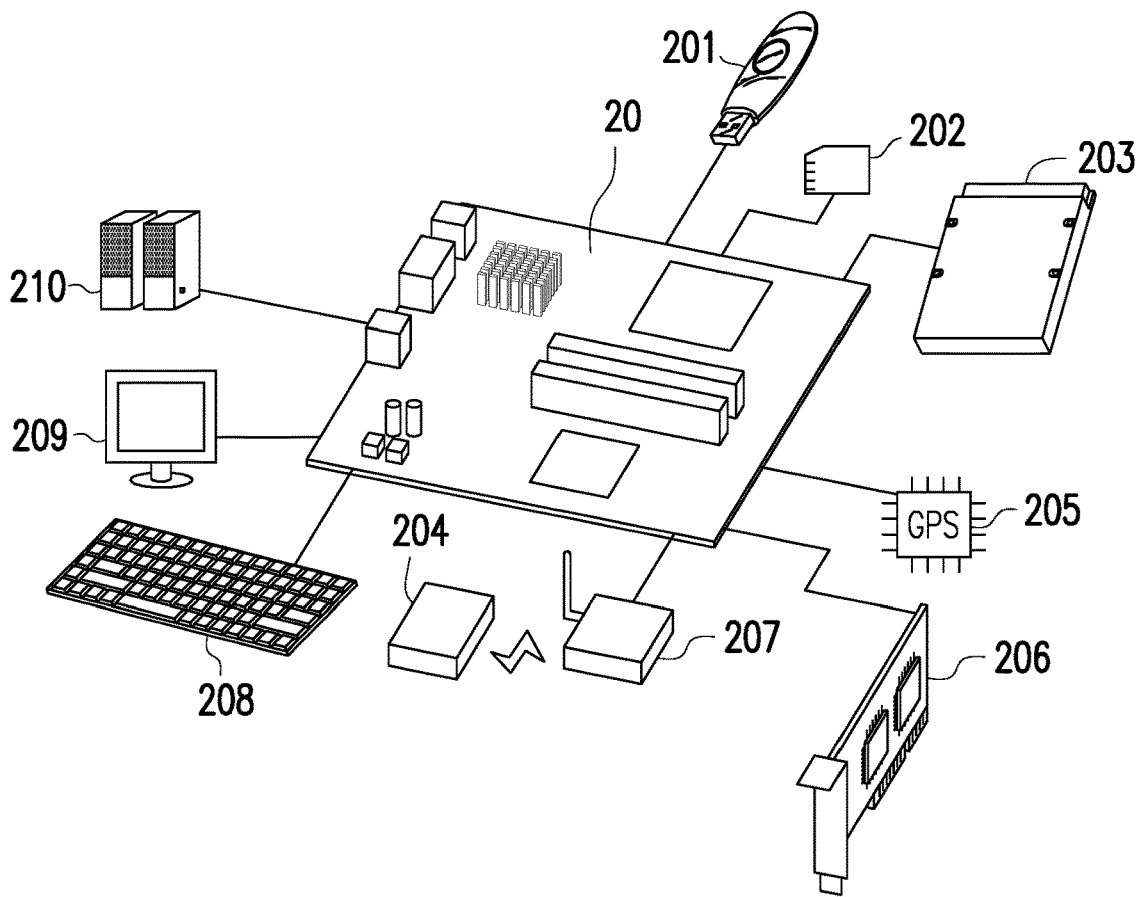
FIG. 2 is a schematic diagram illustrating a host system, a memory storage device and an I/O device according to another exemplary embodiment of the disclosure.

FIG. 1 is a schematic diagram illustrating a host system, a memory storage device and an I/O (input/output) device according to an exemplary embodiment of the disclosure. FIG. 2 is a schematic diagram illustrating a host system, a memory storage device and an I/O device according to another exemplary embodiment of the disclosure.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In this exemplary embodiment, the host system 11 is coupled to a memory storage device 10 through the data transmission interface 114. For example, the host system 11 can store data into the memory storage device 10 or read data from the memory storage device 10 via the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In this exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
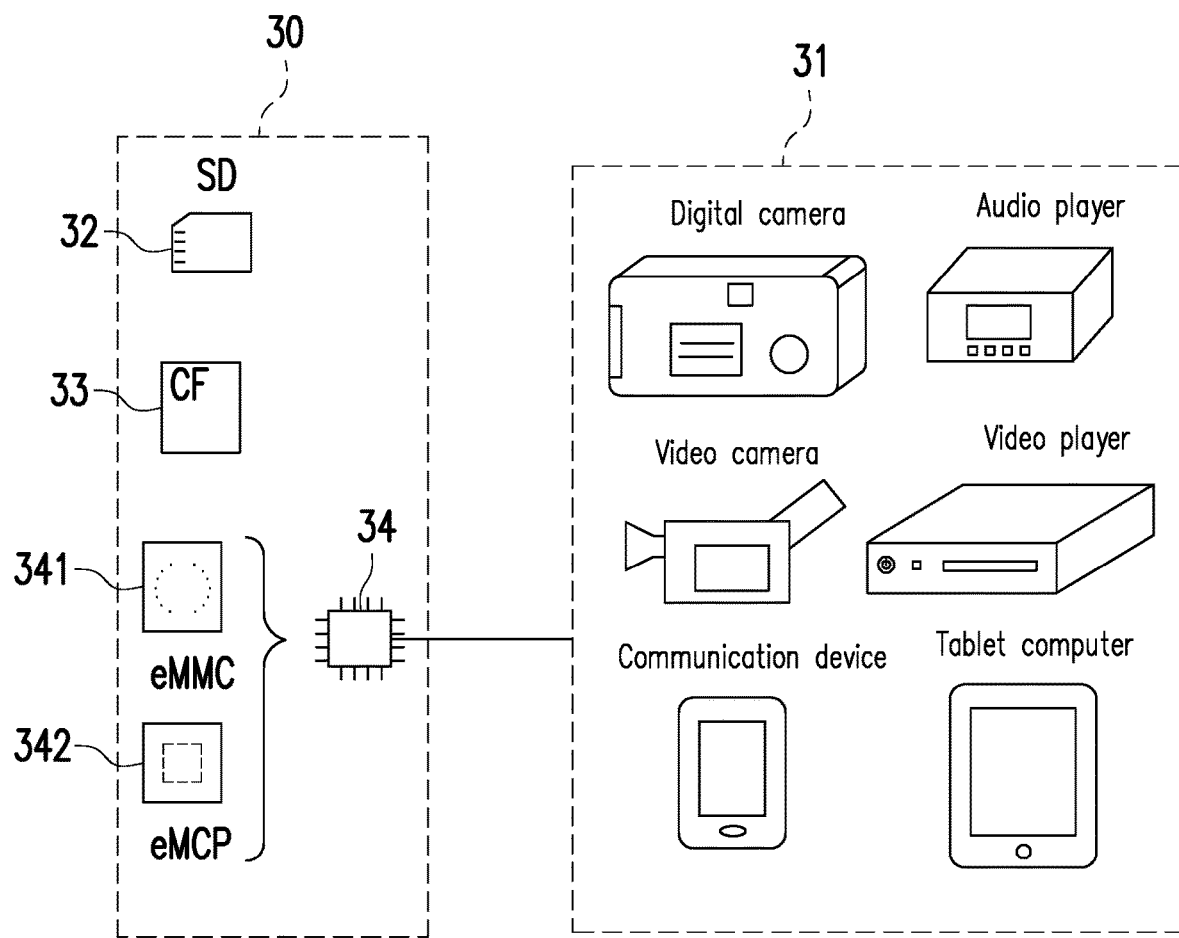
FIG. 3 is a schematic diagram illustrating a host system and a memory storage device according to another exemplary embodiment of the disclosure.

In an exemplary embodiment, aforementioned host system may be any system capable of substantially cooperating with the memory storage device for storing data. Although the host system is illustrated as a computer system in foregoing exemplary embodiment, nonetheless, FIG. 3 is a schematic diagram illustrating a host system and a memory storage device according to another exemplary embodiment of the disclosure. Referring to FIG. 3, in another exemplary embodiment, a host system 31 may also be a system such as a digital camera, a video camera, a communication device, an audio player, a video player or a tablet computer, whereas a memory storage device 30 may be various non-volatile memory storage devices used by the host system 31, such as a SD (Secure Digital) card 32, a CF (Compact Flash) card 33 or an embedded storage device 34. The embedded storage device 34 includes various embedded storage devices capable of directly coupling a memory module onto a substrate of the host system, such as an eMMC (embedded Multi Media Card) 341 and/or an eMCP (embedded Multi Chip Package) storage device 342.

Figure 4:
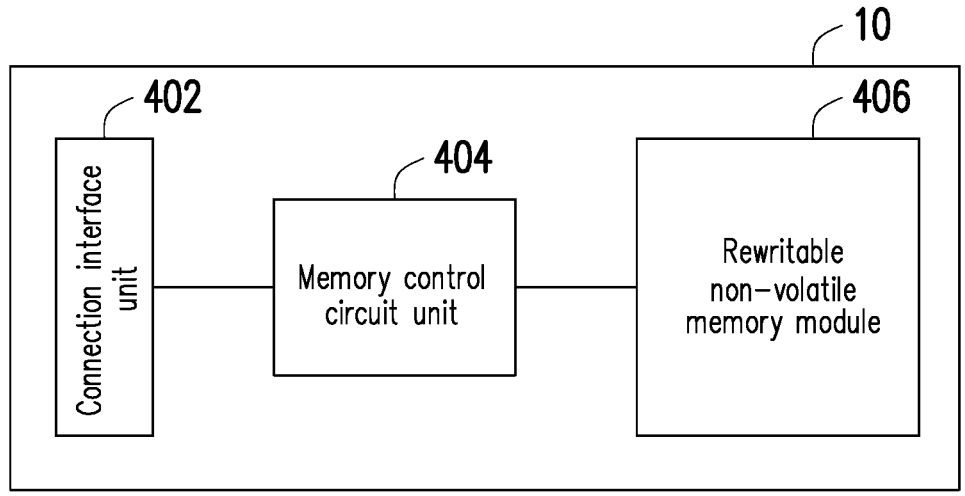
FIG. 4 is a schematic block diagram illustrating a memory storage device according to an exemplary embodiment of the disclosure.

FIG. 4 is a schematic block diagram illustrating a memory storage device according to an exemplary embodiment of the disclosure.

Referring to FIG. 4, the memory storage device 10 includes a connection interface unit 402, a memory control circuit unit 404 and a rewritable non-volatile memory module 406.

The connection interface unit 402 is configured to couple to the memory storage device 10 to the host system 11. The memory storage device 10 can communicate with the host system 11 through the connection interface unit 402. In this exemplary embodiment, the connection interface unit 402 is compatible with a SATA (Serial Advanced Technology Attachment) standard. Nevertheless, it should be understood that the disclosure is not limited in this regard. The connection interface unit 402 may also be compatible with a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a MCP interface standard, a MMC interface standard, an eMMC interface standard, a UFS (Universal Flash Storage) interface standard, an eMCP interface standard, a CF interface standard, an IDE (Integrated Device Electronics) interface standard or other suitable standards. The connection interface unit 402 and the memory control circuit unit 404 may be packaged into one chip, or the connection interface unit 402 may be distributed outside of a chip containing the memory control circuit unit 404.

The memory control circuit unit 404 is configured to execute a plurality of logic gates or control commands which are implemented in a hardware form or in a firmware form and execute operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), a QLC (Quad Level Cell) NAND flash memory module (i.e., a flash memory module capable of storing four bits in one memory cell), other flash memory modules or other memory modules with the same characteristics.

In the rewritable non-volatile memory module 406, one or more bits are stored by changing a voltage (hereinafter, also known as a threshold voltage) of each of the memory cells. More specifically, in each of the memory cells, a charge trapping layer is provided between a control gate and a channel. Amount of electrons in the charge trapping layer may be changed by applying a write voltage to the control gate thereby changing the threshold voltage of the memory cell. This operation of changing the threshold voltage of the memory cell is also known as "writing data into the memory cell" or "programming the memory cell". By changing the threshold voltage, each of the memory cells in the rewritable non-volatile memory module 406 can have a plurality of storage states. The storage state to which the memory cell belongs may be determined by applying a read voltage to the memory cell, so as to obtain the one or more bits stored in the memory cell.

In this exemplary embodiment, the memory cells of the rewritable non-volatile memory module 406 can constitute a plurality of physical programming units, and the physical programming units can constitute a plurality of physical erasing units. Specifically, the memory cells on the same word line can constitute one or more of the physical programming units. If each of the memory cells can store two or more bits, the physical programming units on the same word line can be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. Generally, in the MLC NAND flash memory, a writing speed of the lower physical programming unit is higher than a writing speed of the upper physical programming unit, and/or a reliability of the lower physical programming unit is higher than a reliability of the upper physical programming unit.

In this exemplary embodiment, the physical programming unit is the minimum unit for programming. That is, the physical programming unit is the minimum unit for writing data. For example, the physical programming unit may be a physical page or a physical sector. If the physical programming unit is the physical page, the physical programming unit can include a data bit area and a redundancy bit area. The data bit area contains multiple physical sectors configured to store user data, and the redundant bit area is configured to store system data (e.g., management data such as an error correcting code, etc.). In this exemplary embodiment, the data bit area contains 32 physical sectors, and a size of each physical sector is 512 bytes (B). However, in other exemplary embodiments, the data bit area may also contain 8, 16 physical sectors or different number (more or less) of the physical sectors, and the size of each physical sector may also be greater or smaller. On the other hand, the physical erasing unit is the minimum unit for erasing. Namely, each physical erasing unit contains the least number of memory cells to be erased together. For instance, the physical erasing unit is a physical block.

Figure 5:
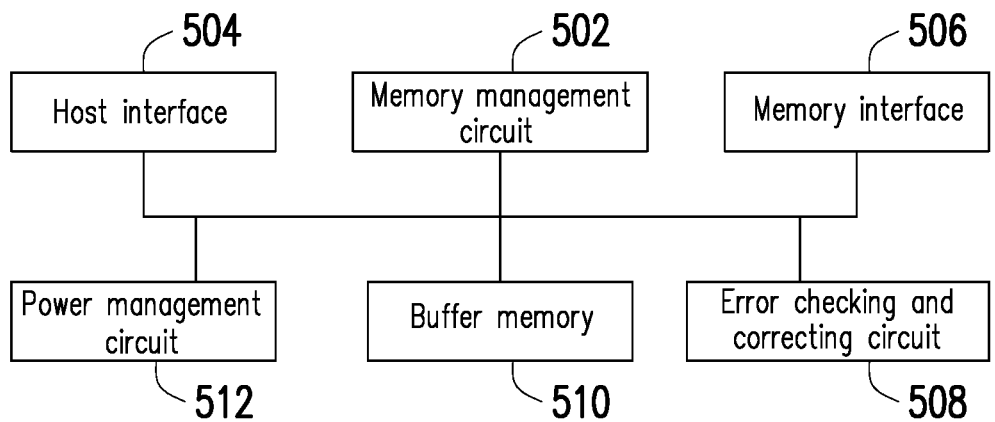
FIG. 5 is a schematic block diagram illustrating a memory control circuit unit according to an exemplary embodiment of the disclosure.

FIG. 5 is a schematic block diagram illustrating a memory control circuit unit according to an exemplary embodiment of the disclosure.

Referring to FIG. 5, the memory control circuit unit 404 includes a memory management circuit 502, a host interface 504 and a memory interface 506.

The memory management circuit 502 is configured to control overall operations of the memory control circuit unit 404. Specifically, the memory management circuit 502 has a plurality of control commands. When the memory storage device 10 operates, the control commands are executed to execute various operations such as data writing, data reading and data erasing. Hereinafter, operations of the memory management circuit 502 are described as equivalent to operations of the memory control circuit unit 404.

In this exemplary embodiment, the control commands of the memory management circuit 502 are implemented in form of firmware. For instance, the memory management circuit 502 has a microprocessor unit (not illustrated) and a ROM (not illustrated), and the control commands are burned into the ROM. When the memory storage device 10 operates, the control commands are executed by the microprocessor to execute operations of writing, reading or erasing data.

In another exemplary embodiment, the control commands of the memory management circuit 502 may also be stored as program codes in a specific area (for example, the system area in a memory exclusively used for storing system data) of the rewritable non-volatile memory module 406. In addition, the memory management circuit 502 has a microprocessor unit (not illustrated), a ROM (not illustrated) and a RAM (not illustrated). More particularly, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to execute operations, such as writing, reading or erasing data.

Further, in another exemplary embodiment, the control commands of the memory management circuit 502 may also be implemented in form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of a memory cell group of the rewritable non-volatile memory module 406. The memory writing circuit is configured to send a write command sequence to the rewritable non-volatile memory module 406 so as to write data into the rewritable non-volatile memory module 406. The memory reading circuit is configured to send a read command sequence to the rewritable non-volatile memory module 406 so as to read data from the rewritable non-volatile memory module 406. The memory erasing circuit is configured to send an erase command sequence to the rewritable non-volatile memory module 406 so as to erase data from the rewritable non-volatile memory module 406. The data processing circuit is configured to process data to be written into the rewritable non-volatile memory module 406 and data read from the rewritable non-volatile memory module 406. Each of the write command sequence, the read command sequence and the erase command sequence may include one or more program codes or command codes and instructs the rewritable non-volatile memory module 406 to execute the corresponding operations, such as writing, reading and erasing. In an exemplary embodiment, the memory management circuit 502 may further send command sequences of other types to instruct the rewritable non-volatile memory module 406 to execute the corresponding operations.

The host interface 504 is coupled to the memory management circuit 502. The memory management circuit 502 can communicate with the host system 11 through the host interface 504. The host interface 504 may be used to receive and identify commands and data transmitted by the host system 11. For example, the commands and the data transmitted by the host system 11 may be transmitted to the memory management circuit 502 via the host interface 504. In addition, the memory management circuit 502 can transmit data to the host system 11 via the host interface 504. In this exemplary embodiment, the host interface 504 is compatible with the SATA standard. However, it should be understood that the disclosure is not limited thereto, and the host interface 504 may also be compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 sends corresponding command sequences. For example, the command sequences may include the write command sequence as an instruction for writing data, the read command sequence as an instruction for reading data, the erase command sequence as an instruction for erasing data, and other corresponding command sequences as instructions for executing various memory operations (e.g., changing read voltage levels or performing a garbage collection operation). These command sequences are generated by the memory management circuit 502 and transmitted to the rewritable non-volatile memory module 406 via the memory interface 506, for example. The command sequences may include one or more signals, or data transmitted in the bus. The signals or the data may include command codes and program codes.

For example, information such as identification codes and memory addresses are included in the read command sequence.

In an exemplary embodiment, the memory control circuit unit 404 further includes an error checking and correcting circuit 508, a buffer memory 510 and a power management circuit 512.

The error checking and correcting circuit 508 is coupled to the memory management circuit 502 and configured to execute an error checking and correcting operation to ensure the correctness of data. Specifically, when the memory management circuit 502 receives the writing command from the host system 11, the error checking and correcting circuit 508 generates an error correcting code (ECC) or an error detecting code (EDC) for data corresponding to the writing command, and the memory management circuit 502 writes data and the ECC or the EDC corresponding to the writing command to the rewritable non-volatile memory module 406. Then, when the memory management circuit 502 reads the data from the rewritable non-volatile memory module 406, the corresponding ECC and/or the EDC are also read, and the error checking and correcting circuit 508 executes the error checking and correcting operation on the read data based on the ECC and/or the EDC.

The buffer memory 510 is coupled to the memory management circuit 502 and configured to temporarily store data and commands from the host system 11 or data from the rewritable non-volatile memory module 406. The power management unit 512 is coupled to the memory management circuit 502 and configured to control a power of the memory storage device 10.

In an exemplary embodiment, the rewritable non-volatile memory module 406 of FIG. 4 is also known as a flash memory module, the memory control circuit unit 404 is also known as a flash memory controller for controlling the flash memory module, and/or the memory management circuit 502 of FIG. 5 is also known as a flash memory management circuit.

Figure 6:
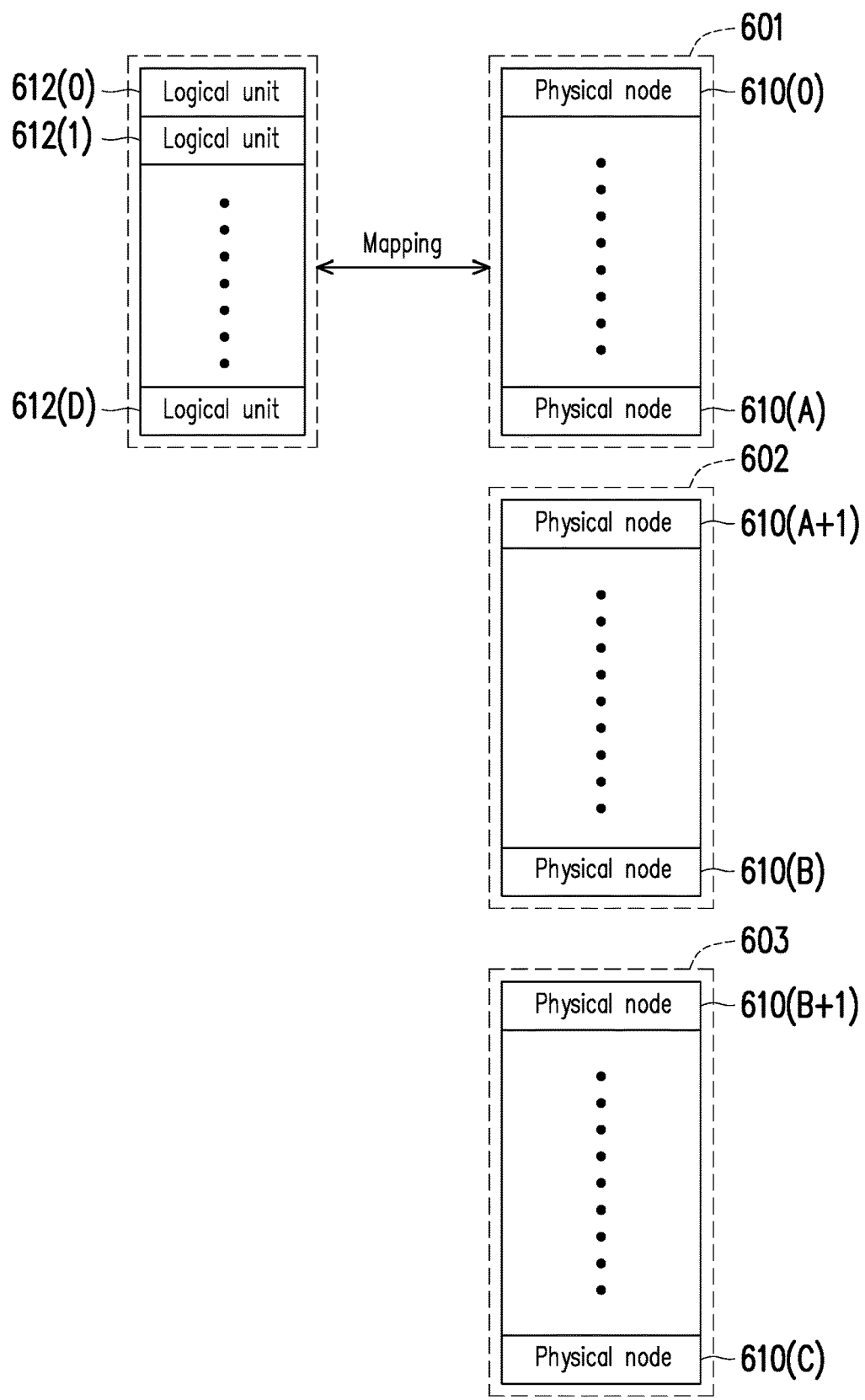
FIG. 6 is a schematic diagram illustrating management of a rewritable non-volatile memory module according to an exemplary embodiment of the disclosure.

FIG. 6 is a schematic diagram illustrating management of a rewritable non-volatile memory module according to an exemplary embodiment of the disclosure.

With reference to FIG. 6, the memory management circuit 502 can logically group physical nodes 610(0) to 610(C) of the rewritable non-volatile memory module 406 into a storage area 601, a spare area 602 and a system area 603. The physical nodes 610(0) to 610(A) in the storage area 601 are stored with data. For example, the physical nodes 610(0) to 610(A) in the storage area 601 may be stored with valid data and invalid data. The physical nodes 610(A+1) to 610(B) in the spare area 602 are not stored with data (e.g., the valid data). The physical nodes 610(B+1) to 610(C) in the system area 603 are configured to store system data, such as logical-to-physical mapping tables, bad block management tables, device model or management data of other types.

One physical node may contain one or more physical addresses. One physical address may be composed of a plurality of memory cells. When data is to be stored, the memory management circuit 502 can select at least one physical node from the physical nodes 610(A+1) to 610(B) in the spare area 602 and store data from the host system 11 or from at least one physical node in the storage area 601 into the selected physical node. Meanwhile, the selected physical node is associated with the storage area 601. In addition, after a physical node in the storage area 601 is erased, that erased physical node is re-associated with the spare area 602.

The memory management circuit 502 can assigns logical units 612(0) to 612(D) for mapping to the physical nodes 610(0) to 610(A) in the storage area 601. One logical unit may contain one or more logical addresses. Each of the logical units 612(0) to 612(D) may also be mapped to one or more physical nodes. It should be noted that, it is possible that the memory management circuit 502 does not assign any logical unit for mapping to the system area 603, so as to prevent the system data stored in the system area 603 from being changed by users.

The memory management circuit 502 can record a mapping relation (a.k.a. logical-to-physical address mapping information or mapping information) between the logical units and the physical nodes into at least one logical-to-physical mapping table. The logical-to-physical mapping table is stored in the physical nodes 610(B+1) to 610(C) in the system area 603. When the host system 11 intends to read data from the memory storage device 10 or write data into the memory storage device 10, the memory management circuit 502 can execute a data accessing operation on the memory storage device 10 according to the logical-to-physical mapping table.

The memory management circuit 502 can manage and access the physical nodes in the rewritable non-volatile memory module 406 based on a management unit. One management unit is also known as a virtual block (VB). One management unit may contain a plurality of physical nodes. For example, one management unit may cover the physical nodes belonging to a plurality of planes (a.k.a. memory planes) and/or a plurality of chip enables (CE) in the rewritable non-volatile memory module 406. Further, one management unit may be associated with the storage area 601, the spare area 602 or the system area 603. The management unit belonging to the spare area 602 is also known as a spare management unit. The management unit belonging to the storage area 601 is also known as a non-spare management unit.

It is noted that in the following description, some terms may be replaced with corresponding abbreviations for ease of reading (see Table 1).

TABLE 1

| rewritable non-volatile memory module | RNVM module |
|---|---|
| memory management circuit | MMC |
| physical node | PN |
| management unit | MU |
| logical-to-physical mapping table | L2P table |

It should be noted that, the valid data is the latest data belonging to a specific logical unit, and the invalid data is not the latest data belonging to any logical unit. For example, if the host system 11 stores new data into one specific logical unit to overwrite old data originally stored in that specific logical unit (i.e., update the data of that specific logical unit), this new data stored in the storage area 601 is the latest data belonging to that specific logical unit and marked as valid, whereas the old data being overwritten may still be stored in the storage area 601 but marked as invalid.

In this exemplary embodiment, if data belonging to one specific logical unit is updated, a mapping relation between that specific logical unit and the PN stored with the old data belonging to that specific logical unit will be removed, and a mapping relation between that specific logical unit and the PN stored with the latest data belonging to that specific logical unit will be established. However, in another exemplary embodiment, if data belonging to one specific logical unit is updated, a mapping relation between that specific logical unit and the PN stored with the old data belonging to that logical unit may still be maintained.

When the memory storage device 10 leaves the factory, a total number of the MUs belonging to the spare area 602 is a predetermined number (e.g., 30). During operation of the memory storage device 10, more and more MUs may be selected from the spare area 602 and associated with the storage area 601 for storing data (e.g., the user data from the host system 11). Accordingly, the total number of the MUs belonging to the spare area 602 will gradually decrease with use of the memory storage device 10 over time.

During operation of the memory storage device 10, the MMC 502 may continuously update the total number of the MUs belonging to the spare area 602. The MMC 502 may execute a data merge operation according to the number of the MUs in the spare area 602 (i.e., a total number of the spare MUs). For example, the MMC 502 may determine whether the total number of the MUs belonging to the spare area 602 is less than or equal to a threshold value (a.k.a. a first threshold value). The first threshold value may be, for example, 2 or a greater value (e.g., 10), which is not particularly limited by the disclosure. If the total number of the MUs belonging to the spare area 602 is less than or equal to the first threshold value, the MMC 502 may execute the data merge operation. In an exemplary embodiment, the data merge operation is also known as a garbage collection operation.

In the data merge operation, the MMC 502 can select at least one MU from the storage area 601 as a source unit and select at least one MU from the spare area 602 as a recycling unit. The MMC 502 can send at least one command sequence which instructs the RNVM module 406 to copy the valid data from the MUs served as the source unit to the MUs served as the recycling unit. The MU served as the recycling unit and fully written with the valid data may be associated with the storage area 601. After the valid data stored by one specific MU is completely copied to the recycling unit, that specific MU may be erased and associated with the spare area 602. In an exemplary embodiment, the operation of re-associating one specific MU from the storage area 601 back to the spare area 602 (or the operation of erasing one MU) is also known as releasing one spare MU. By performing the data merge operation, one or more spare MUs will be released so the total number of the MUs belonging to the spare area 602 can gradually increase.

After the data merge operation is started, if the MUs belonging to the spare area 602 match a specific condition, the data merge operation may be stopped. For example, the MMC 502 may determine whether the total number of the MUs belonging to the spare area 602 is greater than or equal to one threshold value (also referred to as a second threshold value hereinafter). For example, the second threshold may be greater than or equal to the first threshold. If the total number of the MUs belonging to the spare area 602 is greater than or equal to the second threshold value, the MMC 502 may stop the data merge operation. It should be noted that, stopping the data merge operation refers to ending the data merge operation currently in process. After one data merge operation is stopped, if the total number of the MUs belonging to the spare area 602 is less than or equal to the first threshold value again, the next data merge operation may be executed again to try to release the new spare MUs.

Figure 7:
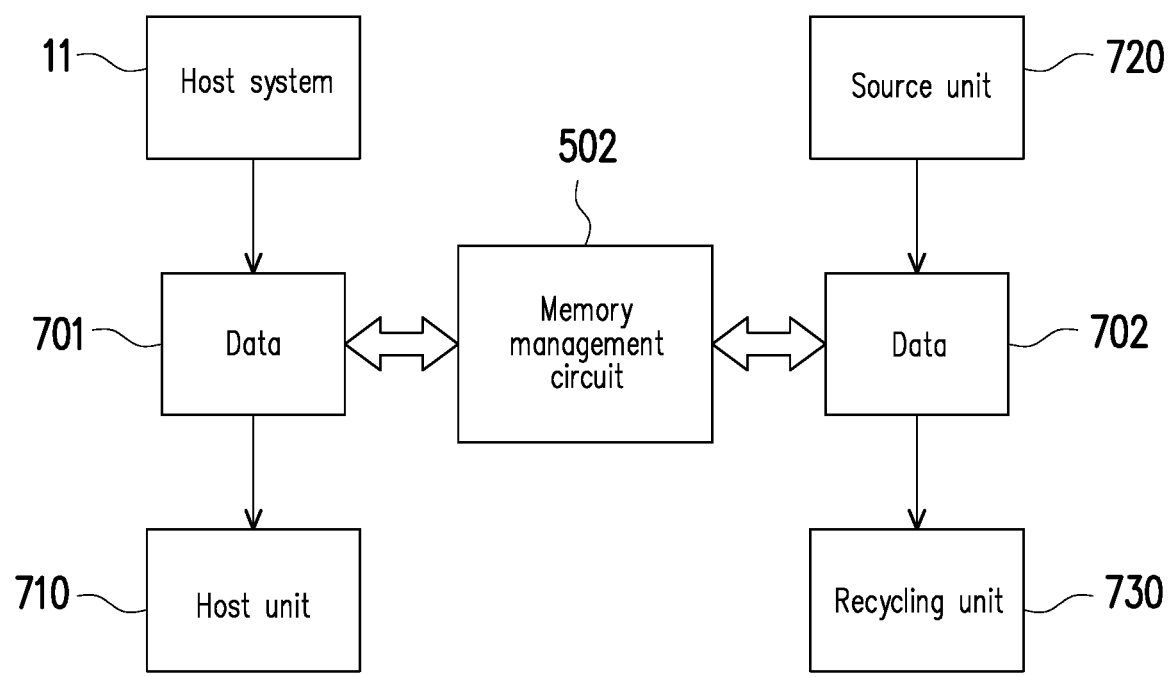
FIG. 7 is a schematic diagram illustrating a host writing operation and a data merge operation according to an exemplary embodiment of the disclosure.

FIG. 7 is a schematic diagram illustrating a host writing operation and a data merge operation according to an exemplary embodiment of the disclosure. With reference to FIG. 7, in the host writing operation, the host system 11 can send at least one write command which instructs a writing of data 701 to one or more logical units (or logical addresses). According to the write command, the MMC 502 can instruct a storing of the data 701 to a host unit 710 which is mapped to said logical units (or logical addresses). For example, the host unit 710 may contain one specific MU selected from the spare area 602 of FIG. 6.

On the other hand, the MMC 502 may start a data merge operation to release new spare MUs. For example, in the data merge operation, data 702 may be collected from at least one MU served as a source unit 720 and written into at least one MU served as a recycling unit 730. The data 702 includes the valid data stored in the source unit 720. If the valid data stored by one specific MU served as the source unit 720 is completely copied to the recycling unit 730, that specific MU may be erased to become a new spare MU. Accordingly, the number of the spare MUs in the spare area 602 of FIG. 6 can gradually increase.

Figure 8:
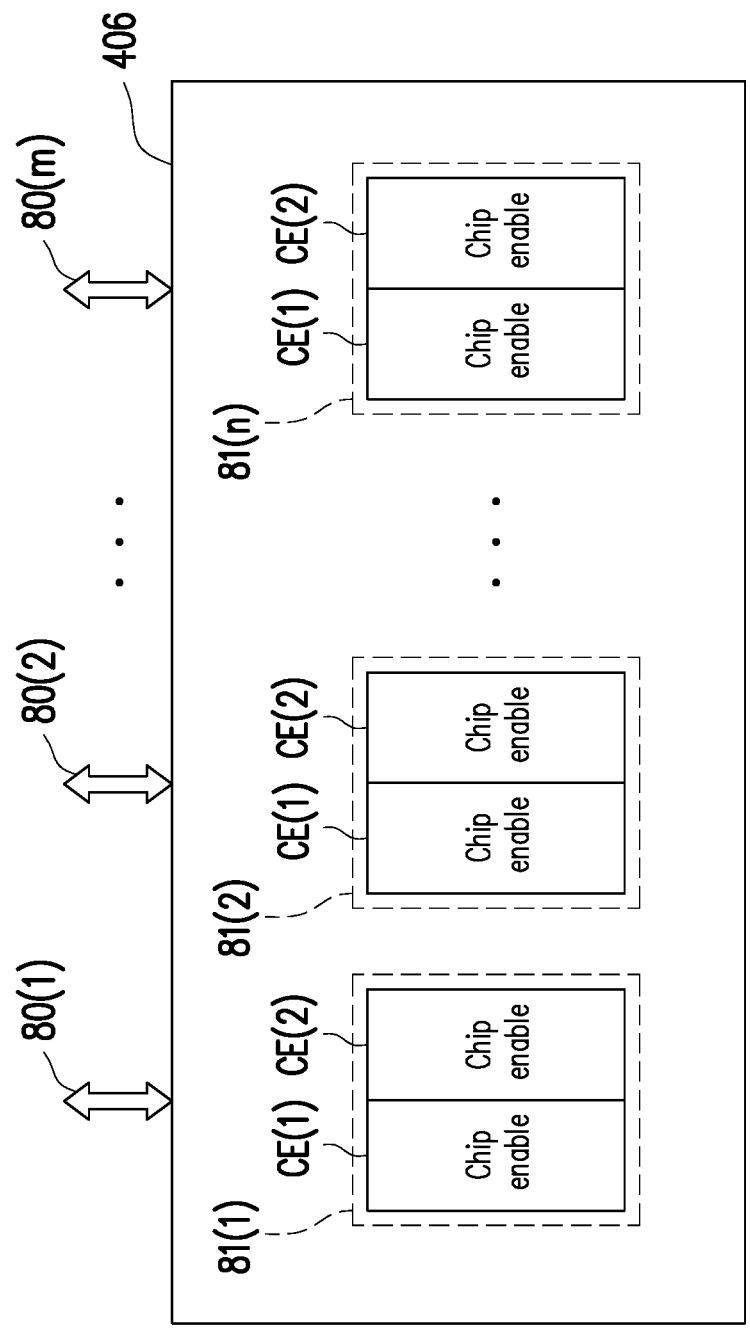
FIG. 8 is a schematic diagram illustrating management of a rewritable non-volatile memory module according to an exemplary embodiment of the disclosure.

FIG. 8 is a schematic diagram illustrating management of a RNVM module according to an exemplary embodiment of the disclosure. Referring to FIG. 8, the RNVM module 406 includes MUs 81(1) to 81(n). Each of the MUs 81(1) to 81(n) contains chip enables CE(1) and CE(2) (a.k.a. a chip enable group). Each of the chip enables CE(1) and CE(2) contains a plurality of PNs. The MMC 502 can access the MUs 81(1) to 81(n) through channels 80(1) to 80(m). For example, the MMC 502 can access the MUs 81(1) and 81(2) in parallel (or interleavedly) through at least two channels among the channels 80(1) to 80(m). In addition, each of the chip enables CE(1) and CE(2) may contain a plurality of planes (e.g., planes PL(1) and PL(2) of FIG. 9).

Figure 9:
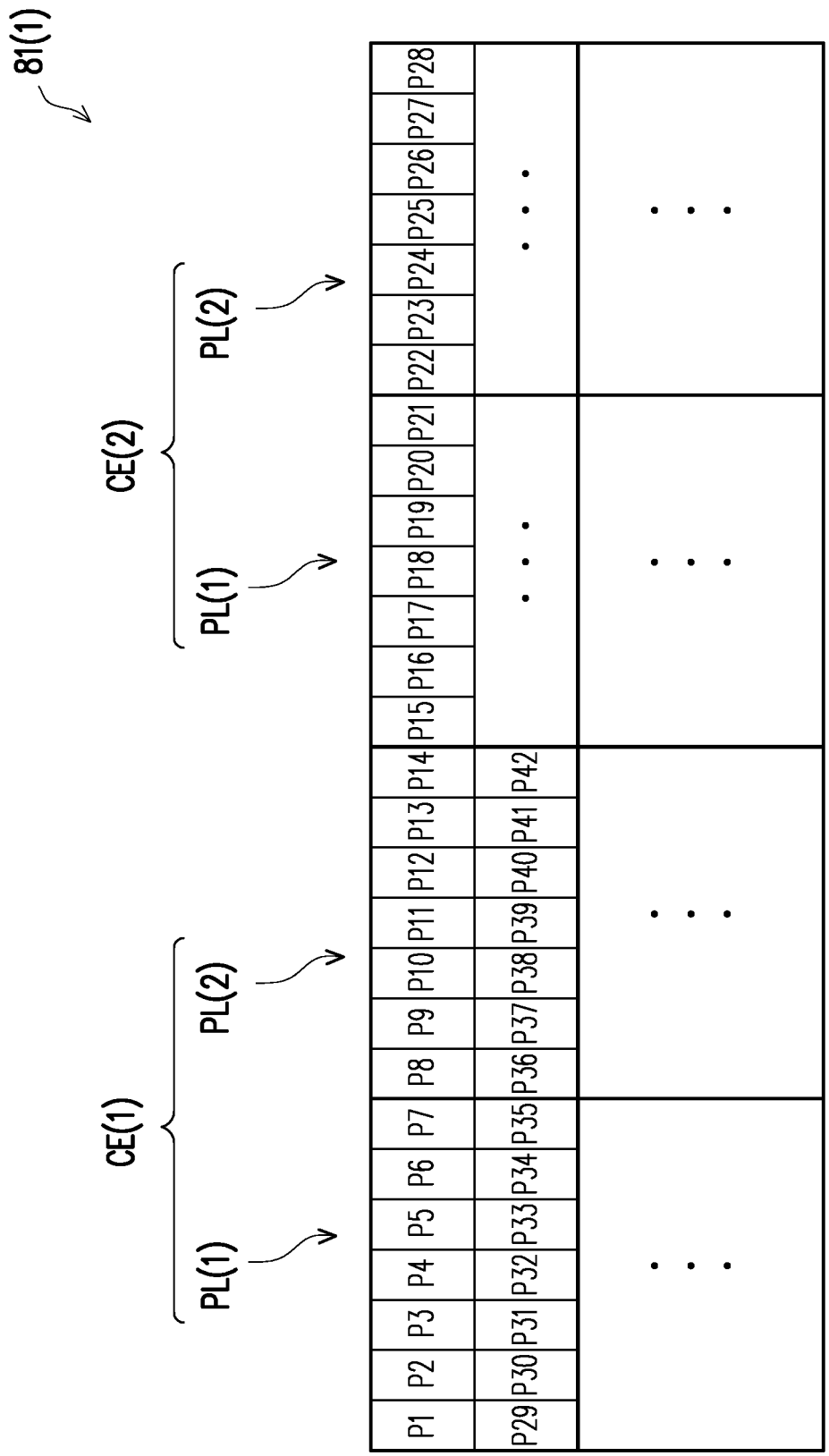
FIG. 9 is a schematic diagram illustrating a management unit according to an exemplary embodiment of the disclosure.

FIG. 9 is a schematic diagram illustrating a MU according to an exemplary embodiment of the disclosure. With reference to FIG. 9 in which the MU 81(1) is taken as an example, the plane PL(1) in the chip enable CE(1) may include PNs P1 to P7, P29 to P35, etc.; the plane PL(2) in the chip enable CE(1) may include PNs P8 to P14, P36 to P42, etc.; the plane PL(1) in the chip enable CE(2) may include PNs P15 to P21, etc.; and the plane PL(2) in the chip enable CE(2) may include PNs P22 to P28, etc. The PNs P1 to P28 may be accessed in parallel (or in interleave) to improve an access efficiency.

In an exemplary embodiment, a plurality of consecutive PNs in one plane (e.g., the PNs P1 to P7) may be referred to as one physical unit. Alternatively, in an exemplary embodiment, a plurality of consecutive PNs in one chip enable (e.g., the PNs P1 to P14) may be referred to as one physical unit. Alternatively, in an exemplary embodiment, a plurality of consecutive PNs in multiple planes (e.g., the PNs P1 to P28) may be referred to as one physical unit.

In an exemplary embodiment, after starting the data merge operation, the MMC 502 can read at least part of L2P table from the RNVM module 406 and analyze a data amount of valid data stored in at least part of the MUs and/or a storage location of the valid data according to the L2P table. Then, according to an analysis result, the MMC 502 can select at least one MU as the source unit and collect the valid data from the source unit. However, it takes time to read and analyze the L2P table. If the logical units to which the valid data stored by one MU belong are quite dispersed (i.e., the mapping information of the logical units are dispersedly recorded among multiple L2P tables), it often takes more time to read the L2P tables in order to obtain the mapping information required, thereby reducing the execution efficiency of the data merge operation.

In an exemplary embodiment, the MMC 502 can maintain specific management information (a.k.a. first management information) in the RNVM module 406. For example, the first management information may be stored in the system area 603 of FIG. 6. The first management information may be used for identifying a specific MU (a.k.a. a first MU) in the RNVM module 406. In the data merge operation, the MMC 502 can automatically select the first MU from a plurality of MUs according to the first management information and collect the valid data (a.k.a. first valid data) from the first MU without reading specific mapping information (a.k.a. first mapping information) from the RNVM module 406. It should be noted that, the first mapping information includes logical-to-physical mapping information related to the first valid data. For example, the first mapping information may reflect a mapping relation between the at least one logical unit to which the first valid data belongs and at least one PN in the first MU. For example, the first mapping information may be recorded in at least one L2P table and stored in the system area 603. Then, the MMC 502 can instruct a storing of the collected first valid data to the recycling unit.

In other words, in an exemplary embodiment, the MMC 502 can select the first MU as the source unit and collect the first valid data from the first MU without reading and analyzing the mapping information related to the first valid data. As such, the execution performance of the data merge operation may be effectively improved. For example, the MMC 502 can save the time for reading and analyzing the first mapping information and quickly collect the first valid data from the first MU.

Figures 10, 11:
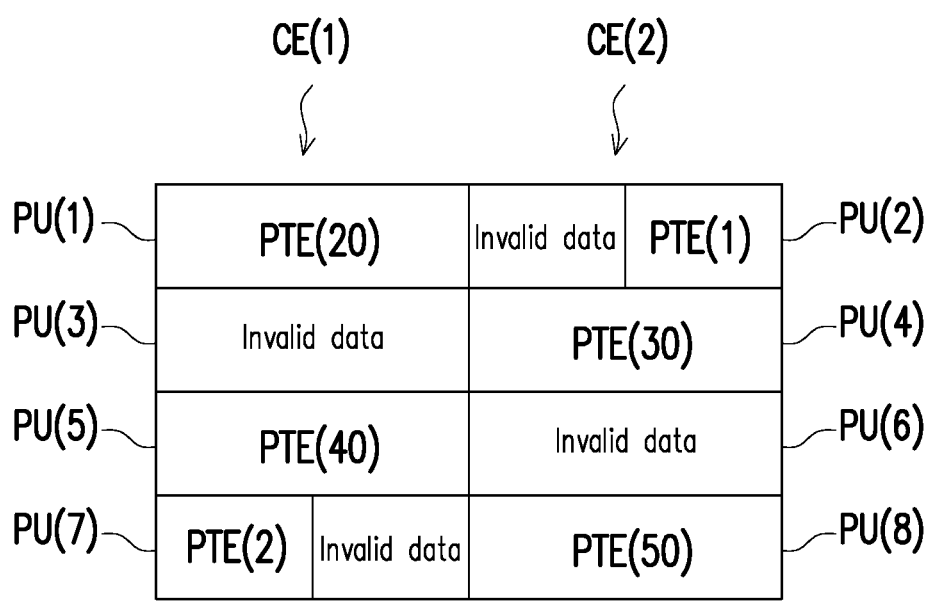
FIG. 10 is a schematic diagram illustrating first management information according to an exemplary embodiment of the disclosure.
FIG. 11 is a schematic diagram illustrating a first management unit according to an exemplary embodiment of the disclosure.

FIG. 10 is a schematic diagram illustrating first management information according to an exemplary embodiment of the disclosure. With reference to FIG. 10, in an exemplary embodiment, the first management information includes table information 1001. The table information 1001 may be stored in the system area 603 of FIG. 6. The table information 1001 may include identification information respectively corresponding to the MUs 81(1) to 81(n). In this exemplary embodiment, it is assumed that the identification information corresponding to the MUs 81(1) and 81(n) are the bit "1" and the identification information corresponding to the MU 81(2) is the bit "0". In the data merge operation, the MMC 502 can select the MU 81(1) (and the MU 81(n)) corresponding to the identification information being the bit "1" as the source unit (i.e., the first MU) according to the table information 1001. It should be noted that, in an exemplary embodiment of FIG. 10, the operation of selecting the MU 81(1) as the source unit is executed without considering the mapping information related to the valid data stored by the MU 81(1).

In an exemplary embodiment, the MMC 502 may also maintain specific management information (a.k.a. second management information) in the first MU. The second management information may be used for identifying at least one physical unit (a.k.a. first physical unit) stored with the first valid data in the first MU. For example, the second management information may be stored in a specific physical unit in the first MU. For example, that specific physical unit may be the last physical unit in the first MU.

In an exemplary embodiment, after selecting the first MU as the source unit, the MMC 502 can read the second management information from the first MU. The MMC 502 can identify the first physical unit in the first MU according to the second management information and collect the first valid data from the identified first physical unit. In an exemplary embodiment, each first physical unit may contain a plurality of consecutive PNs, and these consecutive PNs are configured to store at least part of the first valid data. It should be noted that, in an exemplary embodiment, at least one physical unit (a.k.a. second physical unit) stored with remaining valid data (a.k.a. second valid data) in the first MU may not be identified by using the second management information.

FIG. 11 is a schematic diagram illustrating a first MU according to an exemplary embodiment of the disclosure. FIG. 12 is a schematic diagram illustrating second management information according to an exemplary embodiment of the disclosure.

With reference to FIG. 11 and FIG. 12, it is assumed that the MU 81(1) (i.e., the first MU) is selected as the source unit and the MU 81(1) includes a plurality of physical units PU(1) to PU(8). Each of the physical units PU(1) to PU(8) includes K consecutive PNs. For example, K may be 14, as shown by FIG. 9. Nonetheless, in another exemplary embodiment, the value of K may be larger or smaller, and the disclosure is not limited thereto. In addition, in another exemplary embodiment, the MU 81(1) may also include more or less physical units, and the disclosure is not limited thereto.

In this exemplary embodiment, it is assumed that the physical units PU(1), PU(4), PU(5) and PU(8) are the first physical units, and the physical units PU(2) and PU(7) are the second physical units. The physical units PU(3) and PU(6) are not stored with the valid data. The second management information may include table information 1201. The table information 1201 may be stored in the MU 81(1). For example, the table information 1201 may be stored in the last physical unit (e.g., the physical unit PU(8)) in the MU 81(1). The table information 1201 may be used for identifying the physical units PU(1), PU(4), PU(5) and PU(8). For example, in the table information 1201, the identification information corresponding to the physical units PU(1), PU(4), PU(5) and PU(8) may be the bit "1" to reflect that the physical units PU(1), PU(4), PU(5) and PU(8) are the first physical units. On the other hand, in the table information 1201, the identification information corresponding to the physical units PU(2), PU(3), PU(6) and PU(7) may be the bit "0" to reflect that the physical units PU(2), PU(3), PU(6) and PU(7) are not the first physical unit. Accordingly, after the MU 81(1) is selected as the source unit, the physical units PU(1), PU(4), PU(5) and PU(8) may be identified as the first physical unit and the first valid data may be collected therefrom according to the table information 1201.

In an exemplary embodiment, the MMC 502 can also maintain specific management information (a.k.a. third management information) in the RNVM module 406. The third management information may include index information for reading logical-to-physical mapping information related to the valid data stored by the first MU.

FIG. 13 is a schematic diagram illustrating third management information according to an exemplary embodiment of the disclosure. With reference to FIG. 11 and FIG. 13, in this exemplary embodiment, it is assumed that the third management information includes table information 1301. Further, in this exemplary embodiment, it is assumed that mapping information of the valid data (i.e., the first valid data) stored in the physical units PU(1), PU(4), PU(5) and PU(8) is respectively recorded in L2P tables corresponding to the index information PTE(20), PTE(30), PTE(40) and PTE(50).

According to the table information 1301, PTE(i) in the PTE indexes (i.e., the index information) corresponds to the L2P table numbered by i. The identification information of the index information PTE(1), PTE(2), PTE(20), PTE(30), PTE(40) and PTE(50) are the bit "1", which indicates that the mapping information of at least part of the valid data stored by the MU 81(1) are respectively recorded in the L2P tables corresponding to the index information PTE(1), PTE (2), PTE(20), PTE(30), PTE(40) and PTE(50).

Figure 14:
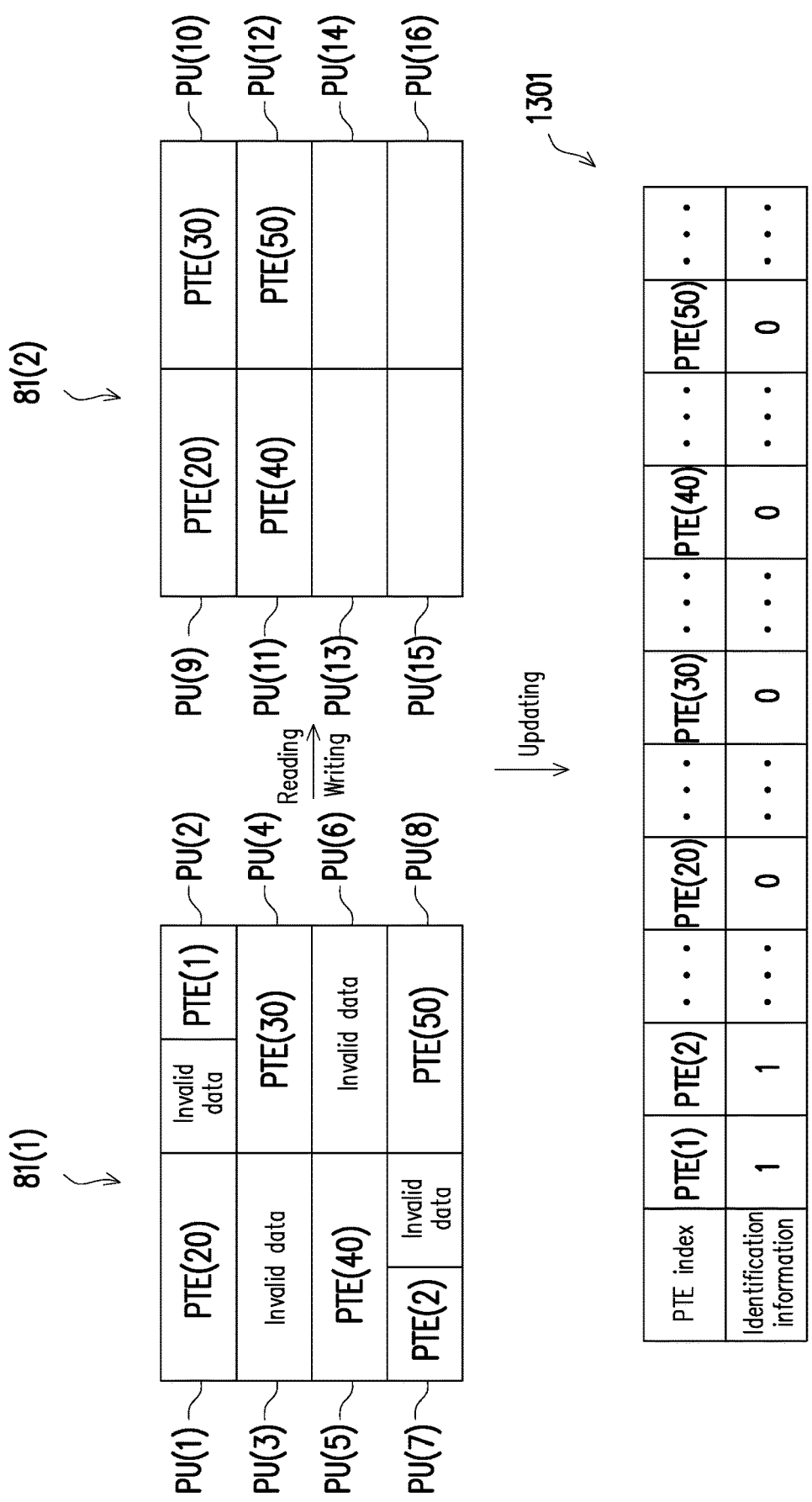
FIG. 14 is a schematic diagram illustrating a data merge operation according to an exemplary embodiment of the disclosure.

FIG. 14 is a schematic diagram illustrating a data merge operation according to an exemplary embodiment of the disclosure. With reference to FIG. 14, after the physical units PU(1), PU(4), PU(5) and PU(8) are identified as the first physical units, the first valid data may be read from the physical units PU(1), PU(4), PU(5) and PU(8) and sequentially written into the recycling unit. It should be noted that, in this exemplary embodiment, it is assumed that the MU 81(2) is the recycling unit, and the collected first valid data may be written into physical units PU(9) to PU(12) in the MU 81(2).

In an exemplary embodiment, the MMC 502 can update the third management information in response to a collection of the first valid data (or the first valid data being written into the recycling unit). With FIG. 14 as an example, after the first valid data is written into the physical units PU(9) to PU(12), the identification bits corresponding to the index information PTE(20), PTE(30), PTE(40) and PTE(50) in the table information 1301 may be updated to the bit "0" to indicate that the MU 81(1) is not stored with the valid data corresponding to the index information PTE(20), PTE(30), PTE(40) and PTE(50). In addition, the MMC 502 can update the mapping information of the first valid data in the L2P tables corresponding to the index information PTE(20), PTE(30), PTE(40) and PTE(50) to reflect that the first valid data is already moved to the physical units PU(9) to PU(12) for storage.

In an exemplary embodiment, the MMC 502 can read specific mapping information (a.k.a. second mapping information) from the RNVM module 406 according to the updated third management information. The second mapping information can include logical-to-physical mapping information related to second valid data. The second valid data is stored in at least one second physical unit in the first MU. The MMC 502 can collect the second valid data from the second physical unit according to the second mapping information and store the collected second valid data into the recycling unit.

Figure 15:
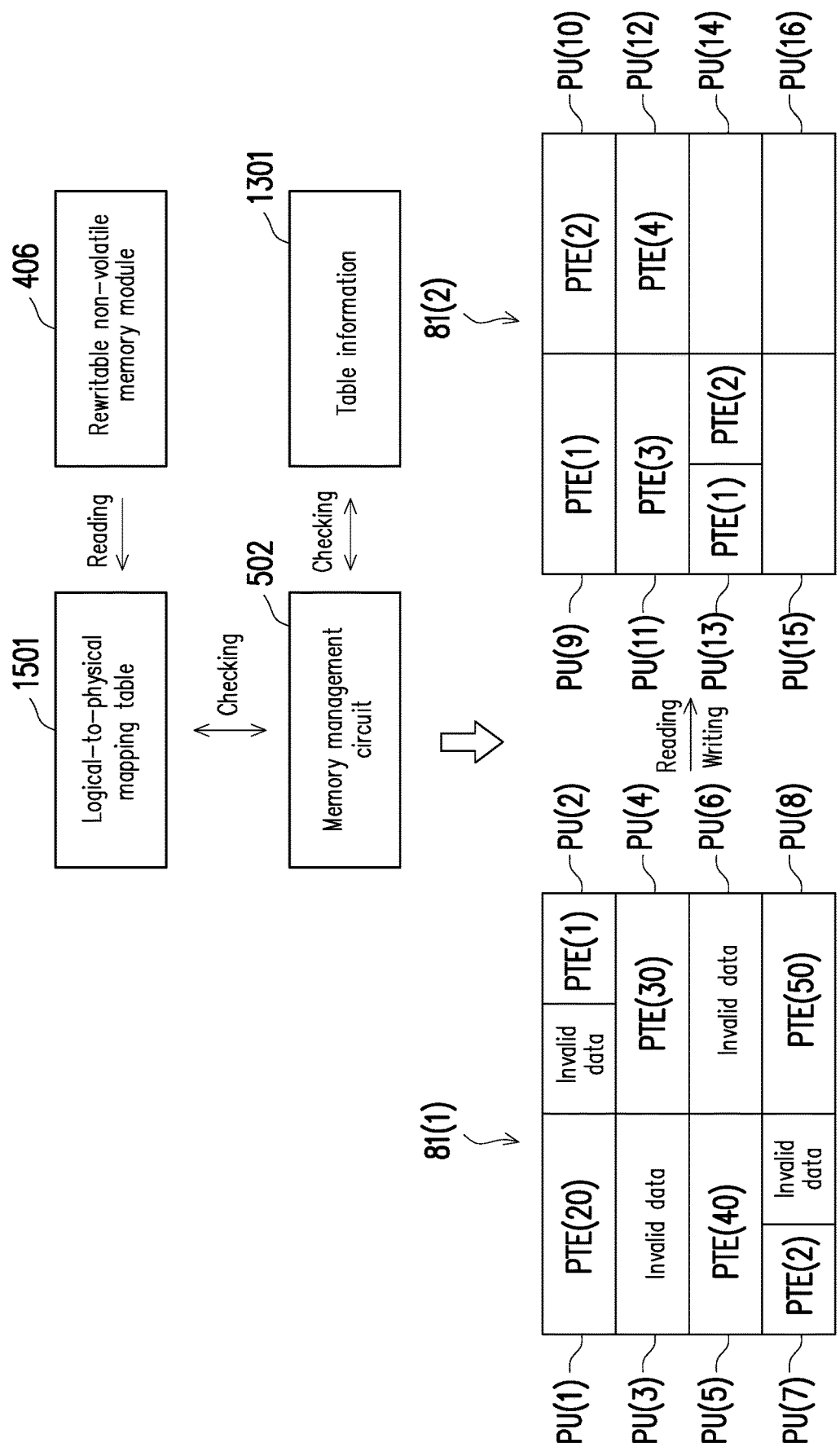
FIG. 15 is a schematic diagram illustrating a data merge operation according to an exemplary embodiment of the disclosure.

FIG. 15 is a schematic diagram illustrating a data merge operation according to an exemplary embodiment of the disclosure. With reference to FIG. 15, after storing the first valid data into the MU 81(2) and updating the table information 1301, the MMC 502 can check the table information 1301 and read a L2P table 1501 from the RNVM module 406 according to a checking result of the table information 1301. For example, in this exemplary embodiment, it is assumed that the identification information corresponding to the index information PTE(1) and PTE(2) are still the bit "1" in the updated table information 1301, and thus the read L2P table 1501 can include information recorded by the L2P tables corresponding to the index information PTE(1) and PTE(2).

The MMC 502 can analyze whether the data stored by the physical units PU(2), PU(3), PU(6) and PU(7) are the valid data according to the L2P table 1501. In this exemplary embodiment, it is assumed that the physical unit PU(2) is stored with both the valid data and the invalid data; the physical unit PU(3) is only stored with the invalid data; the physical unit PU(6) is only stored with the invalid data; and the physical unit PU(7) is stored with both the valid data and the invalid data. Based on the analysis result, the MMC 502 can automatically read the valid data (i.e., the second valid data) from the physical units PU(2) and PU(7) and write the second valid data into the MU 81(2) served as the recycling unit (e.g., a physical unit PU(13)). After storing the first valid data and the second valid data into the MU 81(2) (i.e., the valid data in the MU 81(1) is completely collected), the MU 502 can give the instruction for erasing the MU 81(1).

In the exemplary embodiments of FIG. 11 to FIG. 15, collecting the first valid data (as shown by FIG. 14) does not involve reading and analyzing of the L2P table, and only a small portion in collecting of the second valid data (as shown by FIG. 15) requires reading and analyzing the L2P table. Therefore, compared with the traditional method in which the data stored by the MU (or the physical block) requires analyzing the L2P table, the valid data may be collected more quickly in the data merge operation according to the exemplary embodiments of the disclosure, thereby improving the execution efficiency of the data merge operation overall and/or the system performance of the memory storage device.

It should be noted that, in an exemplary embodiment, in response to a specific condition (a.k.a. a first condition) being satisfied, the MMC 502 can add identification information corresponding to the first MU to the first management information. For example, the first condition can include at least one of the following conditions. For example, the first MU should include a plurality of consecutive PNs, and these consecutive PNs are all configured to store at least part of the first valid data. In other words, the first MU should include at least one of the first physical units described above. In addition, a logical range to which the first valid data in the first MU belongs should be different from a logical range to which remaining valid data in the first MU belongs. In other words, the logical ranges to which the first valid data and the second valid data belong must not overlap with each other (or the first valid data and the second valid data should not have the same index information PTE(i)). In this way, the first MU selected according to the first management information can provide an optimal data merge performance.

With FIG. 11 as an example, since all the physical units PU(1), PU(4), PU(5) and PU(8) in the MU 81(1) are the first physical units, the MU 81(1) can satisfy the condition that the first MU should include at least one of the first physical units. In addition, because a logical range to which the first valid data in the MU 81(1) belongs corresponds to a logical range of the index information PTE(20), PTE(30), PTE(40) and PTE(50) and a logical range to which the second valid data in the MU 81(1) corresponds to a logical range of the index information PTE(1) and PTE(2), the MU 81(1) also satisfies the condition that the logical ranges to which the first valid data and the second valid data must not overlap with each other. In response to at least one of the conditions in the first condition satisfied by the MU 81(1), the MMC 502 can mark the identification information corresponding to the MU 81(1) as the bit "1" in the table information 1001 of FIG. 10. By doing so, the data merge operation executed on the MU 81(1) according to the first management information and the second management information (and the third management information) can then provide the optimal execution performance.

In an exemplary embodiment, in response to the first condition not being satisfied (or an un-satisfaction of the first condition), the MMC 502 can remove the identification information corresponding to the first MU from the first management information. For example, in an exemplary embodiment of FIG. 10 and FIG. 11, if each of the physical units PU(1), PU(4), PU(5) and PU(8) includes at least part of the invalid data because of the data written by the host system 11, and/or the logical ranges of the first valid data and the second valid data in the MU 81(1) overlap with each other, the MMC 502 can update the identification information corresponding to the MU 81(1) as the bit "0" in the table information 1001. In this way, according to the updated table information 1001, the next data merge operation executed will not select the MU 81(1) as the first MU.

It should be noted that, in the exemplary embodiments of FIG. 10 to FIG. 15, the table information 1001, 1201 and 1301 are all examples instead of limitations to the disclosure. In another exemplary embodiment, the table information 1001, 1201 and 1301 may have other data formats or may record other useful information. Moreover, in another exemplary embodiments of FIG. 10 to FIG. 15, if all the physical units PU(1) to PU(8) in the MU 81(1) are the first physical units, then after the first valid data is collected from the physical units PU(1) to PU(8), the MU 81(1) may be erased directly, and the operation of collecting the second valid data in FIG. 15 may not be performed.

Figure 16:
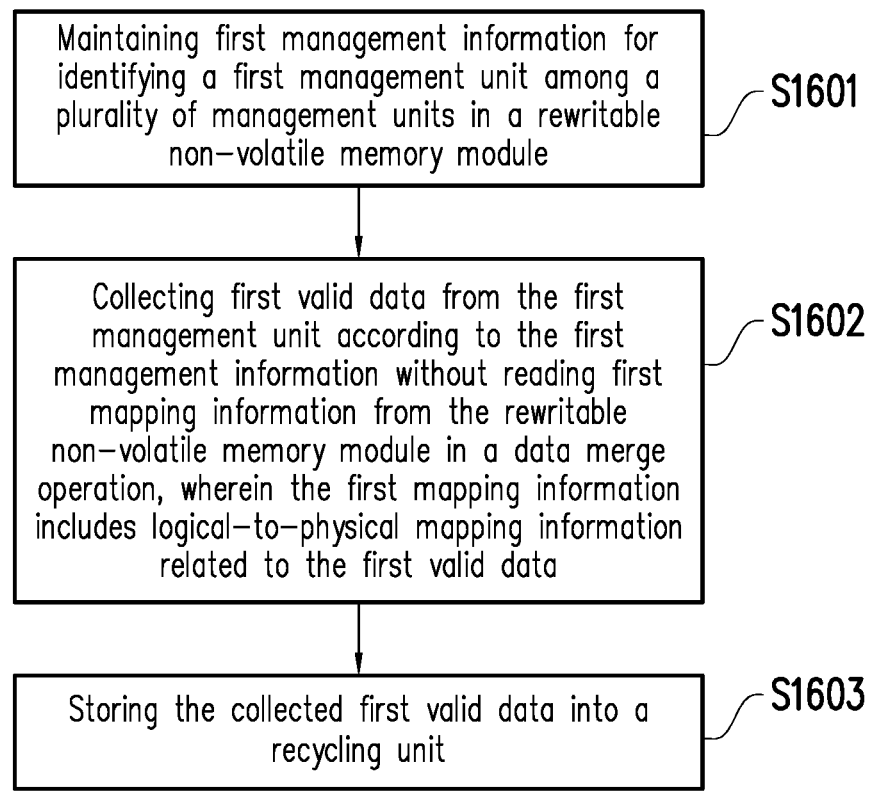
FIG. 16 is a flowchart illustrating a memory control method according to an exemplary embodiment of the disclosure.

FIG. 16 is a flowchart illustrating a memory control method according to an exemplary embodiment of the disclosure. With reference to FIG. 16, in step S1601, first management information is maintained in a RNVM module. The first management information is used for identifying a first MU among a plurality of MUs. In step S1602, first valid data is collected from the first MU according to the first management information without reading first mapping information from the RNVM module in a data merge operation. The first mapping information includes logical-to-physical mapping information related to the first valid data. In step S1603, the collected first valid data is stored into a recycling unit.

Figure 17:
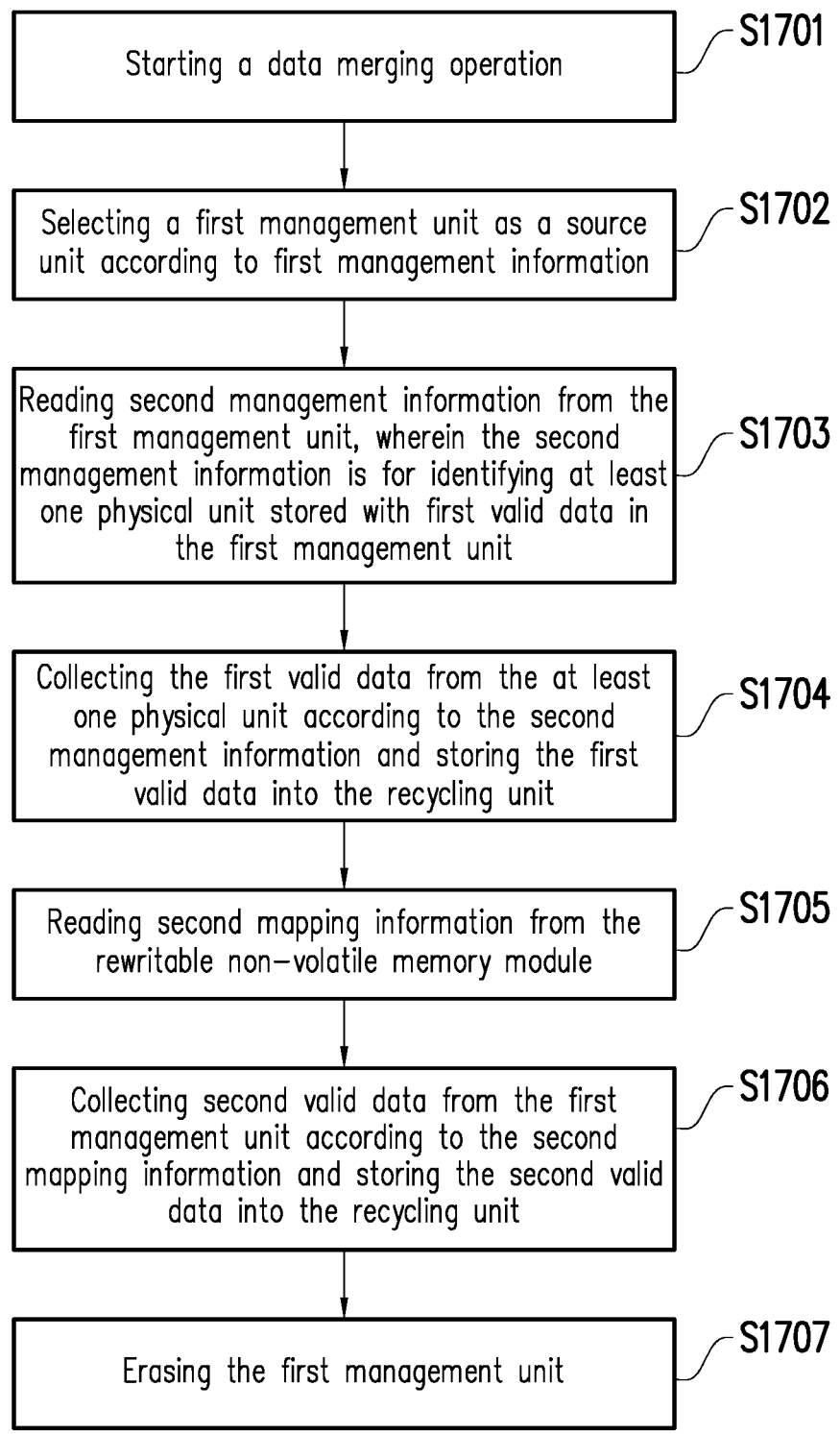
FIG. 17 is a flowchart illustrating a memory control method according to an exemplary embodiment of the disclosure.

FIG. 17 is a flowchart illustrating a memory control method according to an exemplary embodiment of the disclosure. With reference to FIG. 17, in step S1701, a data merge operation is started. In step S1702, a first MU is selected as a source unit according to first management information. In step S1703, second management information is read from the first MU. The second management information is used for identifying at least one physical unit stored with first valid data in the first MU. In step S1704, the first valid data is collected from the at least one physical unit according to the second management information and the first valid data is stored into a recycling unit. In step S1705, second mapping information is read from the RNVM module. In step S1706, second valid data is collected from the first MU according to the second mapping information and the second valid data is stored into the recycling unit. In step S1707, the first MU is erased.

Nevertheless, each of steps depicted in FIG. 16 and FIG. 17 have been described in detail as above, thus related description thereof is not repeated hereinafter. It should be noted that, the steps in FIG. 16 and FIG. 17 may be implemented as a plurality of program codes or circuits, which are not particularly limited in the disclosure. Moreover, the methods disclosed in FIG. 16 and FIG. 17 may be implemented with reference to above embodiments, or may be implemented separately, which are not particularly limited in the disclosure.

In summary, the MMC can automatically maintain the first management information for identifying the first MU among a plurality of MUs in the RNVM module. In the data merge operation, the MMC can automatically collect the first valid data from the first MU according to the first management information and store the first valid data into the recycling unit without reading the first mapping information from the RNVM module. In addition, by determining whether a specific MU satisfies the first condition (e.g., whether the first physical unit is being included and/or whether specific valid data and the remaining valid data in the first MU use the same logical range), the MMC can automatically update the first management information for matching the current usage condition of the memory storage device. As a result, the time for executing the data merge procedure may be effectively shorten and/or the execution efficiency of the data merge procedure may be improved overall to thereby improve the system performance of the memory storage device.

The previously described exemplary embodiments of the present disclosure have the advantages aforementioned, wherein the advantages aforementioned not required in all versions of the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A memory control method for a rewritable non-volatile memory module, wherein the rewritable non-volatile memory module comprises a plurality of management units, and the memory control method comprises:
   associating the management units with a storage area, a spare area or a system area, respectively;
   maintaining and storing first management information and first mapping information in the management units belonging to the system area in the rewritable non-volatile memory module, wherein the first management information is used for identifying a first management unit among the plurality of management units;
   collecting first valid data from the first management unit according to the first management information stored in the system area without reading the first mapping information stored in the system area from the rewritable non-volatile memory module in a data merge operation, wherein the first mapping information comprises logical-to-physical mapping information related to the first valid data; and
   storing the collected first valid data into a recycling unit.

2. The memory control method according to claim 1, wherein a step of collecting the first valid data from the first management unit according to the first management information without reading the first mapping information from the rewritable non-volatile memory module comprises:
   reading second management information from the first management unit, wherein the second management information is used for identifying at least one first physical unit stored with the first valid data in the first management unit; and
   collecting the first valid data from the at least one first physical unit according to the second management information.

3. The memory control method according to claim 2, wherein each of the at least one first physical unit comprises a plurality of consecutive physical nodes, and the plurality of consecutive physical nodes are configured to store at least part of the first valid data.

4. The memory control method of claim 1, further comprising:
    updating third management information in response to a collection of the first valid data, wherein the third management information comprises index information used for reading the logical-to-physical mapping information related to the first valid data.

5. The memory control method of claim 4, further comprising:
    reading second mapping information from the rewritable non-volatile memory module according to the updated third management information, wherein the second mapping information comprises logical-to-physical mapping information related to second valid data;
    collecting the second valid data from at least one second physical unit in the first management unit according to the second mapping information; and
    storing the collected second valid data into the recycling unit.

6. The memory control method according to claim 1, wherein a step of maintaining and storing the first management information and the first mapping information in the management units belonging to the system area in the rewritable non-volatile memory module comprises:
    adding identification information corresponding to the first management unit to the first management information in response to a satisfaction of a first condition,
    wherein the first condition comprises at least one of following conditions:
        the first management unit comprising a plurality of consecutive physical nodes storing at least part of the first valid data; and
        a logical range to which the first valid data belongs being different from a logical range to which remaining valid data in the first management unit belongs.

7. The memory control method according to claim 6, wherein a step of maintaining and storing the first management information and the first mapping information in the management units belonging to the system area in the rewritable non-volatile memory module further comprises:
    removing the identification information corresponding to the first management unit from the first management information in response to an un-satisfaction of the first condition.

8. A memory storage device, comprising:
    a connection interface, configured to couple to a host system;
    a rewritable non-volatile memory module which comprises a plurality of management units; and
    a memory control circuit, coupled to the connection interface unit and the rewritable non-volatile memory module,
    wherein the memory control circuit is configured to associate the management units with a storage area, a spare area or a system area, respectively,
    wherein the memory control circuit is further configured to maintain and store first management information and first mapping information in the management units belonging to the system area in the rewritable non-volatile memory module, and the first management information is used for identifying a first management unit among the plurality of management units,
    the memory control circuit is further configured to collect first valid data from the first management unit according to the first management information stored in the system area without reading the first mapping information stored in the system area from the rewritable non-volatile memory module in a data merge operation,
    wherein the first mapping information comprises logical-to-physical mapping information elated to the first valid data, and
    the memory control circuit is further configured to send a write command sequence which instructs a storing of the collected first valid data to a recycling unit.

9. The memory storage device according to claim 8, wherein an operation that the memory control circuit collects the first valid data from the first management unit according to the first management information without reading the first mapping information from the rewritable non-volatile memory module comprises:
    instructing a reading of second management information from the first management unit, wherein the second management information is used for identifying at least one first physical unit stored with the first valid data in the first management unit; and
    collecting the first valid data from the at least one first physical unit according to the second management information.

10. The memory storage device according to claim 9, wherein each of the at least one first physical unit comprises a plurality of consecutive physical nodes, and the plurality of consecutive physical nodes are configured to store at least part of the first valid data.

11. The memory storage device according to claim 8, wherein the memory control circuit is further configured to update third management information in response to a collection of the first valid data, and the third management information comprises index information used for reading the logical-to-physical mapping information related to the first valid data.

12. The memory storage device according to claim 11, wherein the memory control circuit is further configured to:
    read second mapping information from the rewritable non-volatile memory module according to the updated third management information, and the second mapping information comprises logical-to-physical mapping information related to second valid data;
    collect the second valid data from at least one second physical unit in the first management unit according to the second mapping information; and
    instruct a storing of the collected second valid data to the recycling unit.

13. The memory storage device according to claim 8, wherein an operation that the memory control circuit maintains and stores the first management information and the first mapping information in the management units belonging to the system area in the rewritable non-volatile memory module comprises:
    adding identification information corresponding to the first management unit to the first management information in response to a satisfaction of a first condition,
    wherein the first condition comprises at least one of following conditions:
        the first management unit comprising a plurality of consecutive physical nodes storing at least part of the first valid data; and
        a logical range to which the first valid data belongs being different from a logical range to which remaining valid data in the first management unit belongs.

14. The memory storage device according to claim 13, wherein an operation that the memory control circuit maintains and stores the first management information and the first mapping information in the management units belonging to the system area in the rewritable non-volatile memory module further comprises:
    removing the identification information corresponding to the first management unit from he first management information in response to an un-satisfaction of the first condition.

15. A memory control circuit unit for controlling a rewritable non-volatile memory module, wherein the rewritable non-volatile memory module comprises a plurality of management units, and the memory control circuit unit comprises:
    a host interface, configured to couple to a host system;
    a memory interface, configured to couple to the rewritable non-volatile memory module; and
    a memory management circuit, coupled to the host interface and the memory interface,
    wherein the memory management circuit is configured to associate the management units with a storage area, a spare area or a system area, respectively,
    wherein the memory management circuit is further configured to maintain and store first management information and first mapping information in the management units belonging to the system area in the rewritable non-volatile memory module, and the first management information is used for identifying a first management unit among the plurality of management units,
    the memory management circuit is further configured to collect first valid data from the first management unit according to the first management information stored in the system area without reading the first mapping information stored in the system area from the rewritable non-volatile memory module in a data merge operation, wherein the first mapping information comprises logical-to-physical mapping information related to the first valid data, and
    the memory management circuit is further configured to send a write command sequence which instructs a storing of the collected first valid data to a recycling unit.

16. The memory control circuit unit according to claim 15, wherein an operation that the memory management circuit collects the first valid data from the first management unit according to the first management information without reading the first mapping information from the rewritable non-volatile memory module comprises:
    instructing a reading of second management information from the first management unit, wherein the second management information is used for identifying at least one first physical unit stored with the first valid data in the first management unit; and
    collecting the first valid data from the at least one first physical unit according to the second management information.

17. The memory control circuit unit according to claim 16, wherein each of the at least one first physical unit comprises a plurality of consecutive physical nodes, and the plurality of consecutive physical nodes are configured to store at least part of the first valid data.

18. The memory control circuit unit according to claim 15, wherein the memory management circuit is further configured to update third management information in response to a collection of the first valid data, wherein the third management information comprises index information used for reading the logical-to-physical mapping information related to the first valid data.

19. The memory control circuit unit according to claim 18, wherein the memory management circuit is further configured to:
    read second mapping information from the rewritable non-volatile memory module according to the updated third management information, wherein the second mapping information comprises logical-to-physical mapping information related to second valid data;
    collect the second valid data from at least one second physical unit in the first management unit according to the second mapping information; and
    instruct a storing of the collected second valid data to the recycling unit.

20. The memory control circuit unit according to claim 15, wherein an operation that the memory management circuit maintains and stores the first management information and the first mapping information in the management units belonging to the system area in the rewritable non-volatile memory module comprises:
    adding identification information corresponding to the first management unit to the first management information in response to a satisfaction of a first condition,
    wherein the first condition comprises at least one of following conditions:
        the first management unit comprising a plurality of consecutive physical nodes storing at least part of the first valid data; and
        a logical range to which the first valid data belongs being different from a logical range to which remaining valid data in the first management unit belongs.

21. The memory control circuit unit according to claim 20, wherein an operation that the memory management circuit maintains and stores the first management information and the first mapping information in the management units belonging to the system area in the rewritable non-volatile memory module further comprises:
    removing the identification information corresponding to the first management unit from the first management information in response to an un-satisfaction of the first condition.

* * * * *